(12) United States Patent
Masui et al.

(10) Patent No.: US 6,773,741 B1
(45) Date of Patent: Aug. 10, 2004

(54) WATER-IN-OIL TYPE EMULSIFIED FAT AND/OR OIL COMPOSITION

(75) Inventors: Kenji Masui, Tokyo (JP); Koichi Yasunaga, Tokyo (JP)

(73) Assignee: Kao Corporation, Tokyo (JP)

( * ) Notice: Subject to any disclaimer, the term of this patent is extended or adjusted under 35 U.S.C. 154(b) by 267 days.

(21) Appl. No.: 10/009,494

(22) PCT Filed: Aug. 21, 2000

(86) PCT No.: PCT/JP00/05583
§ 371 (c)(1),
(2), (4) Date: Apr. 8, 2002

(87) PCT Pub. No.: WO01/15542
PCT Pub. Date: Mar. 8, 2001

(30) Foreign Application Priority Data

Aug. 30, 1999 (JP) .......................... 11-243432

(51) Int. Cl.⁷ .............................................. A23D 7/005
(52) U.S. Cl. ....................................... 426/602; 426/607
(58) Field of Search ................................ 426/602, 607

(56) References Cited

U.S. PATENT DOCUMENTS

| | | | | |
|---|---|---|---|---|
| 4,656,045 A | * | 4/1987 | Bodor et al. ................. | 426/601 |
| 5,160,759 A | * | 11/1992 | Nomura et al. ............. | 426/602 |
| 5,684,230 A | | 11/1997 | Fehr et al. | |
| 5,879,735 A | * | 3/1999 | Cain et al. .................. | 426/603 |
| 5,912,042 A | * | 6/1999 | Cain et al. ................... | 426/607 |
| 6,004,611 A | * | 12/1999 | Gotoh et al. ................ | 426/612 |
| 6,022,579 A | | 2/2000 | Mori et al. | |
| 6,139,897 A | * | 10/2000 | Goto et al. ................. | 426/601 |
| 6,287,624 B1 | * | 9/2001 | Mori et al. ................. | 426/601 |
| 6,448,292 B2 | | 9/2002 | Koike et al. | |
| 6,495,536 B1 | | 12/2002 | Masui et al. | |

FOREIGN PATENT DOCUMENTS

| | | |
|---|---|---|
| EP | 0 425 958 | 5/1991 |
| EP | 0 430 329 | 6/1991 |
| WO | 96 32022 | 10/1996 |
| WO | 98 34494 | 8/1998 |

* cited by examiner

Primary Examiner—Carolyn Paden
(74) Attorney, Agent, or Firm—Oblon, Spivak, McClelland, Maier & Neustadt, P.C.

(57) ABSTRACT

The present invention provides a water-in-oil type emulsified fat and/or oil composition of which emulsification is stable in spite of containing a high content of water and which is excellent during storage in physical properties and feeling on eating. That is, the present invention provides a water-in-oil type emulsified oil and/or fat composition which is composed of (1) the oil phase comprising 35 to 95% by weight based on the total oils and fats, of a diglyceride(s) having its increasing melting point of lower than 20° C. and the balance of triglycerides having fatty acid parts comprising 13 to 60% by weight of palmitic acid and 5% by weight or less of fatty acids having 12 or less carbon atoms, polymorph of the triglycerides being stable in the form of β' and (2) the aqueous phase based on water.

2 Claims, 1 Drawing Sheet

An unsaturated fatty acid having 16 or more carbon atoms

WATER-IN-OIL TYPE EMULSIFIED FAT AND/OR OIL COMPOSITION

TECHNICAL FIELD

The present invention relates to a water-in-oil type emulsified fat and/or oil composition which is utilized preferably and suitably in a margarine, a fat spread, a shortening etc.

BACKGROUND ART

As people are health-oriented in recent years, a product being low-calorie- and low-oil-content-type is desired for a margarine or a fat spread.

In general, the method for lowering an oil content includes raising the ratio of an aqueous phase to provide a water-in-oil type emulsified fat and/or oil composition which is a high content of water-containing type. However, when usual fats and oils of triglycerides are used in the oil phase, the emulsified state becomes unstable with an increasing ratio of the aqueous phase. Thus, in during the production step, the aqueous phase tends to separate from the oil phase in a mixing tank for the aqueous at the step of preliminary emulsification and oil phases and the phase reversal from W/O to O/W tends to occur. Further, oozing of water and oil-off is caused during storage. When bulk-handling is carried out, the emulsification is destroyed, and separation, decay or the like of the aqueous is carried out thereby. Therefore, a product exhibiting a satisfied performance could not be obtained.

To solve these disadvantages, methods for using various emulsifiers such as a sucrose fatty acid ester (JP-B 56-10014), a glycerol fatty acid ester (U.S. Pat. No. 3,889,005) and a polyglycerol fatty acid ester (JP-A 58-170432) have been proposed.

However, when the above-mentioned emulsifier is used, although the water-in-oil type emulsified fat and/or oil composition which is a high content of water-containing type can be produced, the obtained product is badly stable by the day during storage so that water oozes and the emulsification is destroyed upon spreading, therefore the following separation of the aqueous phase is generated.

Meanwhile, various methods for blending a large amount of diglycerides (glycerol di-fatty-acid esters) with the oil phase to solve the above-described disadvantages have also been proposed in, for example, JP-A 63-301743, JP-A 61-63242, WO 95/22257, WO 96/32022 and U.S. Pat. No. 5,879,735.

Although a stable water-in-oil type emulsified fat and/or oil composition can be produced by these methods, the product is worsened in viewpoint of the physical property during storage. Then, the product is made to be crumbly and so on, it is poor in feeling on eating, and its spread ability is not satisfied.

DISCLOSURE OF THE INVENTION

The present inventors developed a water-in-oil type emulsified fat and/or oil composition of which emulsification is stable in spite of containing a high content of water and which is excellent in physical properties and feeling on eating during storage.

The present invention provides an water-in-oil type emulsified fat and/or oil composition which is composed of (1) the oil phase comprising 35 to 95% by weight, based on the total oils and fats, of a diglyceride(s) having its increasing melting point of lower than 20° C. and the balance of triglycerides having fatty acid parts comprising 13 to 60% by weight of palmitic acid and 5% by weight or less of fatty acids having 12 or less carbon atoms, polymorph of the triglycerides being stable in the form of β' and (2) the aqueous phase based on water. Thus, the above-mentioned problem of the prior art has been solved.

MODES FOR CARRYING OUT THE INVENTION

Figure 1:
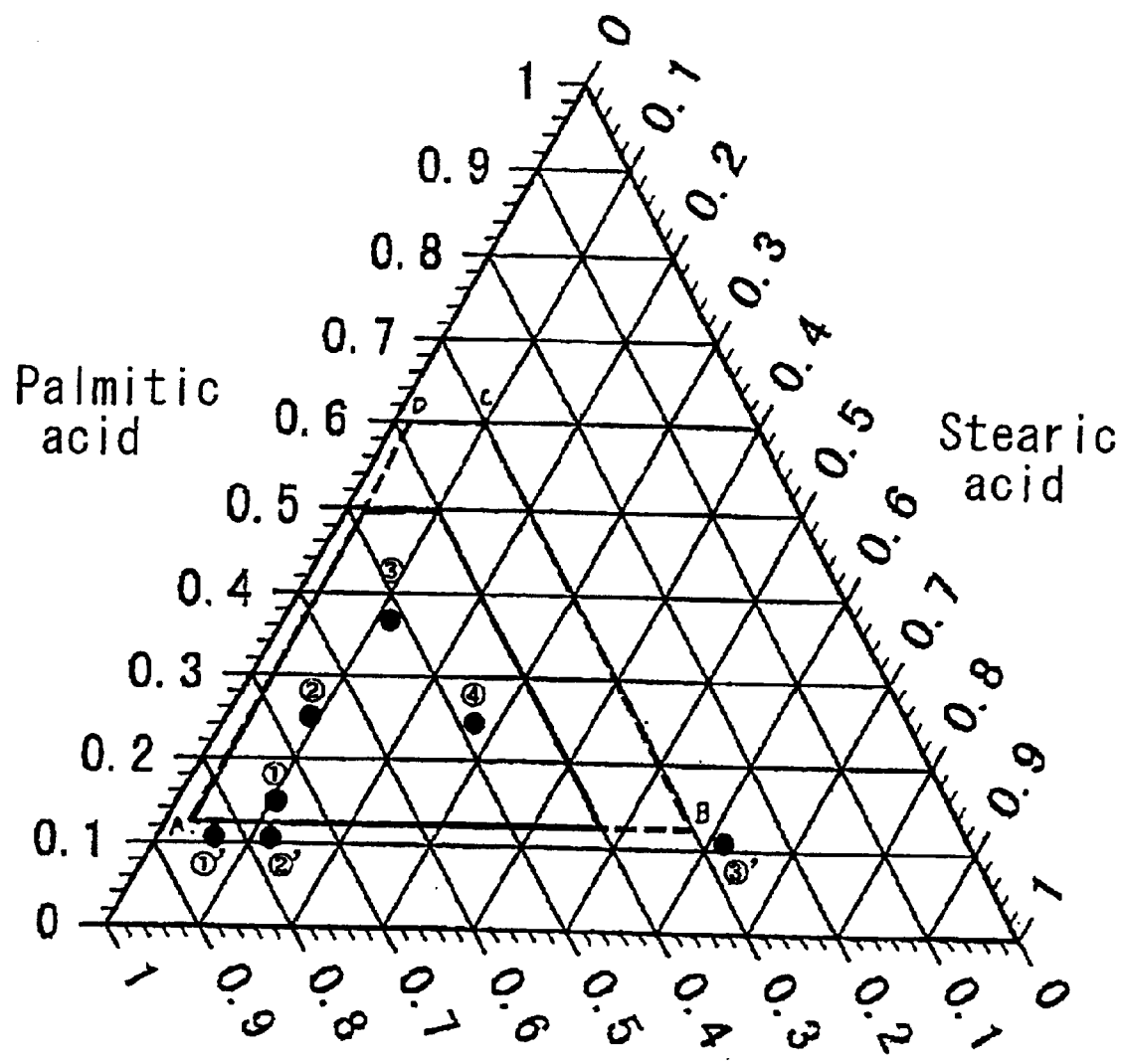
FIG. 1 shows a triangular chart exhibiting a ratio of palmitic acid, stearic acid and an unsaturated fatty acid having 16 or more carbon atoms among fatty acids constituting triglycerides in the oil phase in the water-in-oil type emulsified fat and/or oil composition obtained in the Examples, wherein ① to ④ show the results in Examples 1 to 4 and ①' to ③' show the results in Comparative Examples 1 to 3.

The fatty acid constituting the diglyceride having its increasing melting point of lower than 20° C. (preferably −20 to 15° C.) is preferably an unsaturated fatty acid having 16 to 22 carbon atoms, and its content is 70% by weight or more, more preferably 80% by weight or more, based on the fatty acid constituting the diglyceride.

As the starting fat or oil used in the diglyceride, a fat or oil containing a large amount of an unsaturated fatty acid-residue, for example, including a vegetable (or plant) fat or oil such as safflower oil, olive oil, cottonseed oil, grapeseed oil, corn oil, soybean oil and palm oil; further, an animal fat or oil such as lard, beef-tallow and butter; and a fractional oil thereof, a transesterified oil thereof and a hyrogenated oil (hardened oil) thereof may be used. The diglyceride is obtained by ester-exchanging reaction („ester-interchanging reaction or transesterification) of a mixture of one or more of these fats and oils and glycerol in the presence of a catalyst or by ester-exchanging reaction of a mixture of a fatty acid composition having the high levels of unsaturated fatty acids and glycerol in the presence of a catalyst.

An excess of monoglycerides formed in a mixture of the generated diglycerides can be removed by a molecular distillation method. The monoglycerides are desirably removed to make it as small as possible. It is more preferable that the content thereof is 5% by weight or less, preferably 2% by weight or less,.

From the viewpoint of the stability in the emulsification, the diglycerides are blended in an amount of 35 to 95% by weight and preferably 45 to 90% by weight based on the total fats and oils.

Then, the starting materials of triglycerides whose crystalline polymorph is stable in the form of β' in the present invention are edible fats and/or oils, and there is no particular limitation insofar as the content of a fatty acid having 12 or less carbon atoms is 5% by weight or less based on the total fatty acids for constituent. Namely, there may be used one or more selected from vegetable fats and oils including soybean oil, rapeseed oil, palm oil, corn oil, cottonseed oil, coconut oil and palm kernel oil; and animal fats and oils including lard, fish oil and milk fat; and those obtained by hydrogenation or ester-exchange of these oils. When the content of a fatty acid having 12 or less carbon atoms is more than 5% by weight in the fatty acids constituting triglycerides, a uniquely soapy smell is easily generated by the low-temperature deterioration and hydrolysis of an lauric fat and/or oil to cause particularly the flavor deterioration in margarine, spread etc. during storage.

In the present invention, the term β' in the crystalline polymorph of a fat and/or oil indicates a general tendency for a majority of fats and oils to be crystallized, stable and continued in the β' phase and doesn't indicate the crystalline polymorph of the fat and/or oil not being able to transfer from the β' phase to β phase under a proper condition. The type of crystalline polymorph of fats and oils can be analyzed and identified by X-ray diffraction pattern thereof, and a method thereof is described in general literatures (e.g., "Science of edible fat and oil", p. 201, published by Saiwai Shobo).

In the water-in-oil emulsified fat and/or oil composition of the present invention, the content of palmitic acid in fatty acids constituting triglycerides is desirably 13 to 60% by weight so that the crystalline polymorph of triglycerides in the oil phase containing diglycerides is stable in the form of β'. The remained fatty acids are myristic acid and a saturated or unsaturated fatty acid having 16 to 22 carbon atoms. Further, it is more preferable that a ratio of palmitic acid, stearic acid and an unsaturated fatty acid having 16 or more carbon atoms among fatty acids constituting triglycerides is in the range surrounded by points A (13, 2, 85), B (13, 57, 30), C (60, 10, 30) and D (60, 2, 38) in the triangular chart shown in FIG. 1, whereby it is recognized that the melting behavior in the mouth is significantly improved and the hydration and whipping are also improved. It is particularly preferable that the ratio is in the range surrounded by points A (13, 2, 85), E (13, 47, 40), F (50, 10, 40) and G (50, 2, 48).

The water-in-oil type emulsified fat and/or oil composition of the present invention may be prepared in a usual manner, and the ratio of the aqueous phase based on water to the oil phase by weight can be made within the range of the oil phase: the aqueous phase =20:80 to 85:15 (preferably 40:60 to 85:15).

A dairy product, an emulsifier, a flavor ingredient or the like as a subcomponent in the oil phase may be blended with the composition of the present invention. Further, a flavor ingredient, milk protein, starch, a thickening polysaccharide, a thermoplastic protein (gelatin etc.) or the like may be blended with the aqueous phase based on water.

Further, an anti-oxidant including tocopherol, an ascorbyl ester such as vitamin C palmitate and vitamin C stearate, a tea leaf, a herb such as rosemary, a natural anti-oxidizing component extracted from a leaf or a root of a peach may be used together in order to inhibit the deterioration of the water-in-oil type emulsified fat and/or oil composition.

EXAMPLES

Examples 1 to 4 and Comparative Examples 1 to 3
Preparation of Diglyceride

While the fatty acid obtained from a soybean oil and glycerol were mixed at the molar ratio of 2:1, they were reacted at 70° C. for 3 hours in the presence of a catalyst as a commercial lipase preparation of immobilized 1,3-position-selective lipase (Lipozyrne 3A™ provided by Novo Industry A.S.). During the reaction, the inside pressure of the system was reduced to 0.26 kPa in order to remove water formed by esterification. After the lipase preparation was removed by filtration from the reaction product, the filtrate was subjected to molecular distillation, decoloration and deodorization to obtain a diglyceride composition (consisting of diglyceride content of 88% by weight, monoglyceride content of 1.3% by weight and triglyceride content of 10.7% by weight).

The above-mentioned composition was fractionated by column chromatography (a triglyceride fraction was eluted with hexane from a column packed with Wako Gel C-200 provided by Wako Pure Chemicals, Industries and then a diglyceride fraction was obtained with hexane/ether). As a result of measurement of the melting point of the diglyceride fraction, the open tube melting point was 5° C.

According to the formulation in Table 1, the oil phase and the aqueous phase were mixed and emulsified, and the obtained emulsion was rapidly cooled and plasticized in a usual manner to obtain the water-in-oil type emulsified oil and/or fat compositions in Examples 1 to 4 and Comparative Examples 1 to 2.

In the obtained water-in-oil type emulsified oil and/or fat composition, the content of diglycerides and monoglycerides based on the total fats and oils, as well as the composition of fatty acids in the triglyceride, are shown in Table 2.

The above-mentioned compositions were stored at 5° C. for 30 days and then evaluated for crystalline polymorph of fats and oils, the stability in the emulsification (the state of texture and separation in the aqueous phase at the time for spread), spread ability (coating properties) and feeling on eating (smoothness). The results are shown in Table 1.

The evaluation criteria are as follows.

Crystalline polymorph of fat (s) and/or oil (s): X-ray diffraction was carried out in a usual manner.

Stability in the emulsification: The produced emulsified fat and/or oil composition was coated on bread etc. and then evaluated for separation of the aqueous phase under the following criteria.
○: Water was not separated.
Δ: Water was slightly separated to ooze.
X: Water was separated.

Spread ability: The produced emulsified fat and/or oil composition was coated on bread etc. and then evaluated for performance (degree of easiness to spread, uniform texture and smoothness) under the following criteria.
○: Spread thin and continuously.
Δ: Hardly spread thin and continuously.
X: Not coated thin and continuously.

Feeling on eating: The feeling (smoothness) upon eating of the produced emulsified fat and/or oil composition was evaluated as organoleptic property under the following criteria.
○: Smooth and not crumbly in the mouth.
Δ: Slightly crumbly and slightly rough upon eating.
X: Evidently crumbly and rough upon eating.

TABLE 1

|  | Example 1 | Example 2 | Example 3 | Example 4 | Comparative Example 1 | Comparative Example 2 | Comparative Example 3 |
|---|---|---|---|---|---|---|---|
| Oil phase (% by weight) |  |  |  |  |  |  |  |
| Diglyceride composition | 31.9 | 31.9 | 48.6 | 33.9 |  | 31.9 | 31.9 |
| Soybean oil |  |  |  |  | 31.9 |  |  |
| Palm hydrogenated (or hardened) oil (IV 20) | 1.6 | 4.8 | 18.7 |  |  |  |  |
| Palm hydrogenated (or hardened) oil (IV 2) |  |  | 2.1 | 4 |  |  |  |

TABLE 1-continued

|  | Example 1 | Example 2 | Example 3 | Example 4 | Comparative Example 1 | Comparative Example 2 | Comparative Example 3 |
|---|---|---|---|---|---|---|---|
| Soybean hydrogenated (or hardened) oil (IV 43) | 6.4 | 3.2 |  | 2 | 8 | 8 |  |
| Soybean hydrogenated (or hardened) oil (IV 1.3) |  |  |  |  |  |  | 8 |
| Stearic acid monoglyceride* |  |  | 0.5 |  |  |  |  |
| Vitamin E |  |  | 0.02 |  |  |  |  |
| Carotene |  |  | 0.002 |  |  |  |  |
| Butter flavor | 0.1 | 0.1 | 0.1 | 0.1 | 0.1 | 0.1 | 0.1 |
| Aqueous phase (% by weight) |  |  |  |  |  |  |  |
| Distilled water | 60 | 60 | 28.4 | 60 | 60 | 60 | 60 |
| Skim milk powder |  |  | 0.3 |  |  |  |  |
| Common salt |  |  | 1.3 |  |  |  |  |
| Crystal form of fat or oil | β' | β' | β' | β' | β | β | β |
| Stability of emulsification | ○ | ○ | ○ | ○ | x | ○ | ○ |
| Spreadability | ○ | ○ | ○ | ○ | x | Δ | Δ |
| Feeling on eating | ○ | ○ | ○ | ○ | x | Δ | x |

TABLE 2

|  |  | Example 1 | Example 2 | Example 3 | Example 4 | Comparative Example 1 | Comparative Example 2 | Comparative Example 3 |
|---|---|---|---|---|---|---|---|---|
| Diglyceride content (% by weight) | | 70.4 | 70.3 | 61.6 | 74.8 | 2.0 | 70.4 | 70.4 |
| Monoglyceride content (% by weight) | | 1.0 | 1.1 | 1.6 | 1.1 | 0.0 | 1.0 | 1.0 |
| Fatty acid composition in the triglyceride fraction (% by weight) | C14 | 0.2 | 0.5 | 1.0 | 0.6 | 0.0 | 0.1 | 0.1 |
| | C16 | 15.9 | 25.2 | 37.7 | 24.7 | 11.1 | 11.3 | 11.2 |
| | C18 | 10.6 | 9.0 | 11.4 | 27.3 | 6.3 | 11.4 | 62.8 |
| | C18:1 | 54.6 | 46.7 | 37.2 | 24.6 | 34.5 | 58.5 | 7.9 |
| | C18:2 | 16.2 | 16.2 | 10.8 | 19.9 | 42.1 | 16.1 | 15.8 |
| | C18:3 | 2.5 | 2.5 | 1.8 | 2.8 | 6.0 | 2.5 | 2.2 |

It is evident from Table 1 that the emulsified fat and/or oil composition of the present invention exhibits stable emulsification and is excellent in stability of physical property during storage.

What is claimed is:

1. An water-in-oil type emulsified fat and/or oil composition which is composed of (1) the oil phase comprising 35 to 95% by weight, based on the total oils and fats, of a diglyceride(s) having its increasing melting point of lower than 20° C. and the balance of triglycerides having fatty acid parts comprising 13 to 60% by weight of palmitic acid and 5% by weight or less of fatty acids having 12 or less carbon atoms, polymorph of the triglycerides being stable in the form of β' and (2) the aqueous phase based on water.

2. The water-in-oil type emulsified fat and/or oil composition as claimed in claim 1, wherein a ratio of palmitic acid, stearic acid and an unsaturated fatty acid having 16 or more carbon atoms among fatty acids constituting triglycerides is in the range surrounded by points A (13, 2, 85), B (33, 57, 30), C (60, 10, 30) and D (60, 2, 38) in the triangular chart formed with palmitic acid, stearic acid and the unsaturated fatty acid.

* * * * *